US012031444B2

(12) United States Patent
Chantrait et al.

(10) Patent No.: US 12,031,444 B2
(45) Date of Patent: Jul. 9, 2024

(54) SEALING ASSEMBLY FOR A TURBINE ENGINE

(71) Applicant: SAFRAN AIRCRAFT ENGINES, Paris (FR)

(72) Inventors: Teddy Frederic Gilbert Chantrait, Moissy-Cramayel (FR); Antoine Robert Alain Brunet, Moissy-Cramayel (FR); Mael Thevenot, Moissy-Cramayel (FR); Gilles Jean-Luc Dessein, Garderes (FR); Jean-Yves Fernand Paris, Oursbelille (FR); Vincent Gilbert Alex Wagner, Escondeaux (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/995,818

(22) PCT Filed: Apr. 1, 2021

(86) PCT No.: PCT/FR2021/050577

§ 371 (c)(1),
(2) Date: Oct. 7, 2022

(87) PCT Pub. No.: WO2021/205099

PCT Pub. Date: Oct. 14, 2021

(65) Prior Publication Data

US 2023/0118871 A1 Apr. 20, 2023

(30) Foreign Application Priority Data

Apr. 10, 2020 (FR) ....................................... 2003636

(51) Int. Cl.
*F01D 11/12* (2006.01)

(52) U.S. Cl.
CPC ........ *F01D 11/122* (2013.01); *F05D 2240/55* (2013.01)

(58) Field of Classification Search
CPC . F01D 5/20; F01D 5/225; F01D 11/08; F01D 11/12; F01D 11/122; F05D 2240/11; F05D 2240/307
See application file for complete search history.

(56) References Cited

U.S. PATENT DOCUMENTS 7,857,581 B2 * 12/2010 Mons ...................... F01D 11/02 415/173.5
8,967,972 B2 * 3/2015 Brandl .................... F01D 5/187 415/173.1

(Continued)

FOREIGN PATENT DOCUMENTS

CN 108266236 A 7/2018
EP 1785651 A1 5/2007

(Continued)

OTHER PUBLICATIONS

International Search Report received for PCT Patent Application No. PCT/FR2021/050577, mailed on May 21, 2021, 7 pages (3 pages of English Translation and 4 pages of Original Document).

*Primary Examiner* — Brian P Wolcott
(74) *Attorney, Agent, or Firm* — WOMBLE BOND DICKINSON (US) LLP

(57) ABSTRACT

A sealing assembly (1) for a turbine engine comprising a first element (2) and a second element (3), the first and second elements (2, 3) being concentric and in relative rotational movement with respect to each other about an axis of rotation (X), the sealing assembly (1) comprising at least one first wiper (4*a*) and an abradable member (5), the first wiper (4*a*) being annular in shape and carried by the first element (2), the first wiper (4*a*) extending radially towards the abradable member (5) and continuously around the axis of (Continued)

rotation (X), the abradable member (5) being annular in shape and carried by the second element (3), the abradable member (5) extending tangentially opposite the first wiper (4*a*), the first wiper (4*a*) comprising primary angular portions (11), each extending tangentially along a primary angular sector (11'), the primary angular portions (11) each having, in cross-section, a first constant profile, characterised in that the first wiper (4*a*) comprises secondary angular portions (13) each extending tangentially along a secondary angular sector (13'), the secondary angular portions (13) each having, in cross-section, a second profile different from the first profile, the number of secondary angular portions (13) being equal to the number of primary angular portions (11), the secondary angular portions (13) being interposed between the primary angular portions (11).

15 Claims, 8 Drawing Sheets

(56) References Cited

U.S. PATENT DOCUMENTS

| | | | | |
|---|---|---|---|---|
| 9,163,519 | B2 * | 10/2015 | Kleinow | F01D 11/08 |
| 10,648,346 | B2 * | 5/2020 | Zhang | F01D 11/08 |
| 10,995,623 | B2 * | 5/2021 | Sippel | F01D 5/20 |
| 2007/0110562 | A1 | 5/2007 | Mons et al. | |
| 2017/0074405 | A1 * | 3/2017 | Gaebler | F01D 5/225 |

FOREIGN PATENT DOCUMENTS

| | | | | |
|---|---|---|---|---|
| EP | 3144568 | A1 | 3/2017 | |
| FR | 2974842 | A1 | 11/2012 | |
| FR | 3072121 | A1 * | 4/2019 | F01D 11/001 |
| FR | 3072121 | A1 | 4/2019 | |
| FR | 3078740 | A1 | 9/2019 | |
| FR | 3071540 | B1 | 10/2019 | |
| SU | 792014 | A1 | 12/1980 | |

* cited by examiner

SEALING ASSEMBLY FOR A TURBINE ENGINE

TECHNICAL FIELD OF THE INVENTION

The present invention relates to a sealing assembly for a turbine engine.

TECHNICAL BACKGROUND

A turbine engine comprises numerous dynamic sealing assemblies, i.e. sealing assemblies intended to provide a sealing between two parts, at least one of which is movable.

Dynamic sealing assemblies will be the focus of the remainder of this application.

Such a sealing assembly comprises, for example, a first element (hereinafter referred to as "rotor element") that is rotatable and a second element (hereinafter referred to as "stator element") that is stationary in the reference frame of the turbine engine.

More specifically, the rotor element comprises at least one wiper and the stator element comprises an abradable member extending around the wiper. The wiper is configured to cooperate with the abradable member.

Such a sealing assembly allows to minimise the leakage despite the relative displacements between the wiper and the abradable member.

The wiper is mounted with a radial clearance with respect to the abradable member. When the turbine engine is in operation, the wiper and the abradable member displace (radially and axially) in relation to each other under the effect, in particular, of various outer stresses (thermal, aerodynamic, mechanical, etc.).

Depending on the operating conditions of the turbine engine (take-off, cruise, etc.), the radial clearance is thus reduced or even eliminated during a contact between the wiper and the abradable member. The main contacts take place when the turbine engine is running in.

On contact, the wiper penetrates and cuts the abradable member, generating thus material chips.

For example, it is known from the document FR-B1-3071540 in the name of the applicant to implement a wiper with a constant 360° cross-sectional profile, the summit of the wiper comprising a groove open radially outwardly. Such a wiper improves the sealing of the sealing assembly by increasing the turbulence generated.

However, such a wiper has its drawbacks.

This is because when the wiper comes into contact with the abradable member, the temperature of the sealing assembly elements rises rapidly and significantly. This high temperature rise is caused in particular by the numerous contact surfaces (or friction surfaces), the accumulation of chips in the groove and the absence of cutting elements.

The higher the temperature reached, the hotter the environment in which the sealing assembly is placed.

A high temperature operation significantly limits the service life of the sealing assemblies and requires periodic replacement.

In addition, the significant heating of the sealing assembly imposes a maximum temperature that must not be exceeded for the various environments in which they are installed, to the detriment of performance and the risk of premature wear.

The objective of the present invention is therefore to proposes a sealing assembly that limits the heating induced by the contact between the wiper and the abradable member, while maximising its sealing.

The prior art also comprises the documents FR-A1-3072121, EP-A1-1785651, FR-A1-3078740, FR-A1-2974842, CN-B-108266236, SU-A1-792014 and EP-A1-3144568.

SUMMARY OF THE INVENTION

The invention thus proposes a sealing assembly for a turbine engine comprising a first element and a second element, the first and second elements being concentric and in relative rotational movement with respect to each other about an axis of rotation X, said sealing assembly comprising at least one first wiper and an abradable member, the first wiper being annular in shape and carried by the first element, the first wiper extending radially towards the abradable member and continuously around the axis of rotation X, the abradable member being annular in shape and carried by the second element, the abradable member extending tangentially opposite the first wiper the first wiper comprising primary angular segments each extending tangentially along a primary angular sector, said primary angular segments each having, in cross-section, a first constant profile, characterised in that the first wiper comprises secondary angular segments each extending tangentially along a secondary angular sector, said secondary angular segments each having, in cross-section, a second profile different from said first profile, the number of secondary angular segments being equal to the number of primary angular segments, the secondary angular segments being interposed between the primary angular segments.

The wiper according to the invention thus comprises an alternation (or alternating succession) of primary angular segments and secondary angular segments, and in other words two successive primary angular segments are separated from each other by a secondary angular segment.

The alternation of primary angular segments and secondary angular segments creates a discontinuity around the axis of rotation X, which is conducive to the cut-out of the abradable member and to the evacuation of the chips of abradable material, so as to limit the heating induced by the contacts between the wiper and the abradable member.

Such a discontinuity also allows to avoid the prolonged contacts between the wiper and the abradable member, and thus also limits the heating induced by the contacts.

Compared to the prior art, such sealing assemblies have an increased service life and can be installed in higher temperature environments, which is in particular beneficial to the performance of the turbine engine.

The structure of the abradable member of such sealing assemblies can be evolved. Indeed, the decrease in temperature allows to consider the replacement of honeycombed structures by compact layer structures. As a reminder, compared to the compact layer structures, the honeycombed structures withstand higher temperatures but induce more pressure drop.

Such sealing assemblies also allow to limit the heat generation, and therefore limit the thermal expansion of the surrounding parts. This increases the service life of the surrounding parts.

The sealing assembly according to the invention may comprise one or more of the following characteristics and/or steps, taken alone or in combination with each other:

- the second profile of at least one of the secondary angular segments varies from one angular position to another;
- each secondary segment comprises at least one sharp edge;

each secondary segment comprises a first recess open radially outwards;

the first recess opens onto at least one lateral surface of the first wiper;

each secondary segment comprises a second recess symmetrical to the first recess with respect to a median plane M of the first wiper, the median plane M being perpendicular to the axis of rotation X of the sealing assembly; the second recess being distinct from the first recess the first recess has the shape of a circular segment;

each of the first and second recesses is blind (or non-opening);

the first and second recesses do not communicate with each other;

each secondary segment comprises a central crest which is centred on a median plane M, the central crest being delimited laterally by each of the first and second recesses, the median plane M being perpendicular to the axis of rotation X of the sealing assembly;

each of the first and second recesses is defined by a sharp edge, the sharp edge having a closed curved outline;

each of the first and second recesses comprises a bottom with a connection fillet;

the first recess forms a flat on an outer surface of the first wiper;

the flat is delimited tangentially by two sharp edges, each in the form of a sharp ridge;

each of the two sharp edges is substantially parallel to the axis of rotation X of the sealing assembly;

each of the first and second recesses is partially or locally open (or opening), so as to form a passage or a communication between the first and second recesses;

each secondary segment comprises a tapered segment (or crest) and a pointed segment separated from each other by the passage and bordered by the first and second recesses;

the tapered segment comprises a biconcave stretch and a biconvex stretch;

the biconcave stretch is adjacent to a primary segment and the biconvex stretch is tangentially arranged between the biconcave stretch and the passage;

the passage is delimited tangentially by two radial sharp ridges, namely a first sharp ridge of the pointed segment and a second sharp ridge of the biconvex stretch of the tapered segment;

each of the first and second recesses is defined by a sharp edge, the sharp edge having an open curved outline;

each secondary segment comprises a wafer fitted on an outer surface of a body of the first wiper;

the wafer comprises a base supported on the outer surface of the body and two opposing wings each extending from the base, each of the wings being supported on a lateral surface of the body;

the base is delimited tangentially by two sharp edges, each in the form of a sharp ridge;

each of the two sharp edges is substantially parallel to the axis of rotation X of the sealing assembly;

said sealing assembly comprises a second independent wiper axially spaced from the first wiper, the abradable member extending tangentially opposite the second wiper.

The present invention also relates to a turbine engine comprising at least one sealing assembly as described above.

BRIEF DESCRIPTION OF THE FIGURES

The invention will be better understood and other details, characteristics and advantages of the present invention will become clearer from the following description made by way of non-limiting example and with reference to the attached drawings, in which.

DETAILED DESCRIPTION OF THE INVENTION

Figure 1:
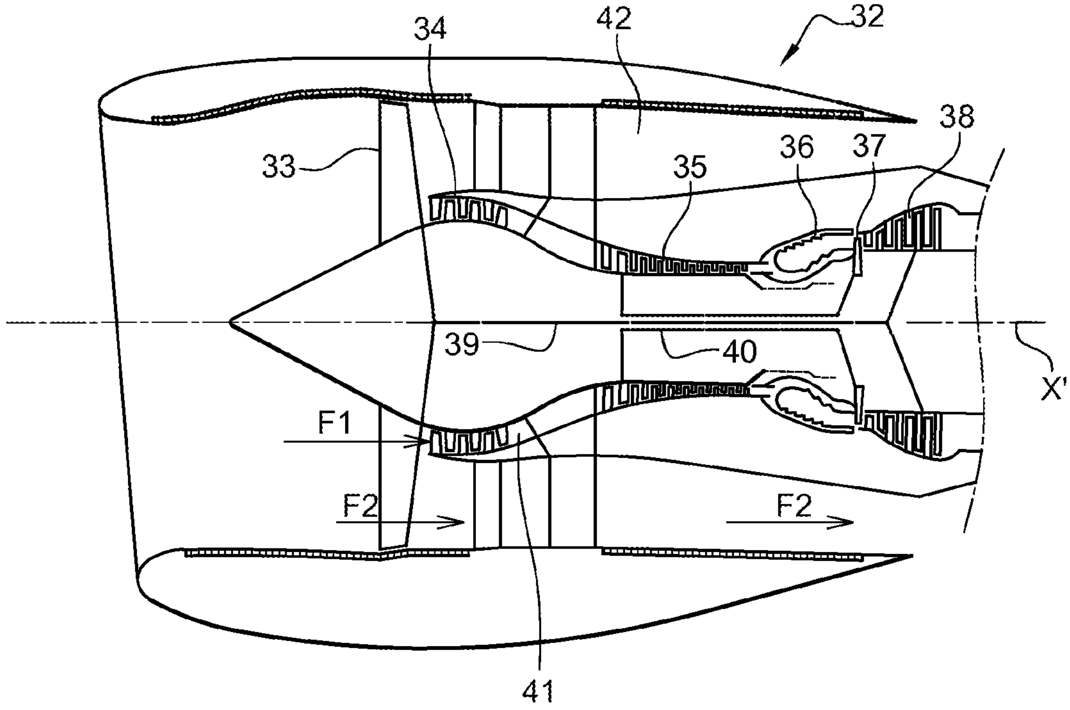
FIG. 1 is a schematic axial sectional view of a turbine engine.
Figure 2:
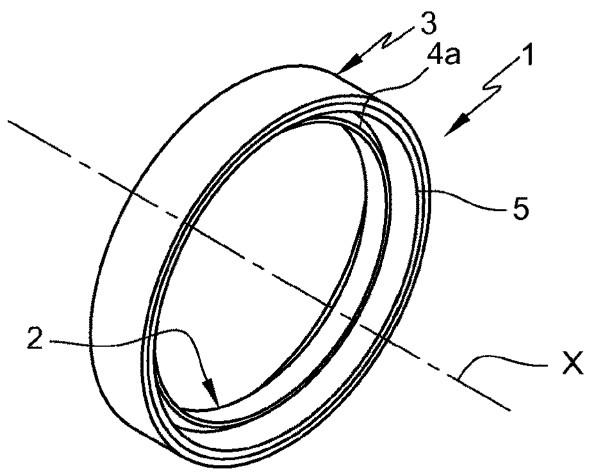
FIG. 2 is a perspective view of a sealing assembly according to a first embodiment of the invention.
Figure 3:
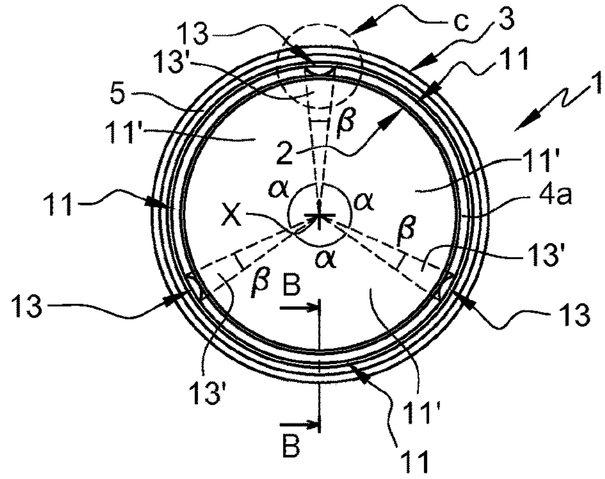
FIG. 3 is a front view of the assembly shown in FIG. 2.
Figure 4:
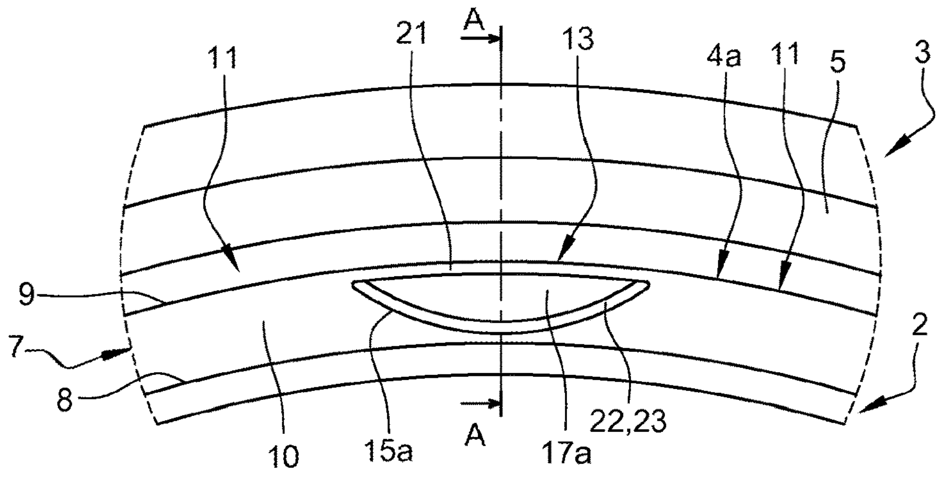
FIG. 4 is a detail view according to the reference frame C of FIG. 3.

FIG. 1 shows a double-flow turbine engine 32 which typically comprises, from upstream to downstream in the flow direction of the gases, a ducted fan 33 and an engine comprising a low-pressure compressor 34, a high-pressure compressor 35, a combustion chamber 36, a high-pressure turbine 37 and a low-pressure turbine 38. The rotors of the low-pressure compressor 34 and the low-pressure turbine 38 are connected by a low-pressure shaft 39 and together form a low-pressure body. The rotors of the high-pressure compressor 35 and the high-pressure turbine 37 are connected by a high-pressure shaft 40 and together form a high-pressure body. The low-pressure shaft 39 and the high-pressure shaft 40 are coaxial and rotatable about an axis of rotation X'.

The airflow generated by the fan is divided by a stationary structure of the turbine engine 32 into a primary airflow F1 that enters a primary duct 41 of the engine and a secondary airflow F2 that flows into a secondary duct 42 arranged around the engine.

FIGS. 2 to 21 show a sealing assembly 1 for a turbine engine 32 comprising a first element 2 and a second element 3. The first and second elements 2, 3 are concentric and in rotational movement relative to each other about an axis of rotation X. The sealing assembly 1 comprises at least one wiper **4*a*-4*d* and an abradable member 5. The wiper 4*a*-4*d* is annular and carried by the first element 2. The wiper 4*a*-4*d*** extends radially towards the abradable member 5 and continuously around the axis of rotation X. The abradable member 5 is annular in shape and carried by the second element 3. The abradable member 5 extends tangentially opposite the wiper 4$a$-4$d$.

In the present application, "axial" or "axially" means any direction parallel to the axis of rotation X, and "radial" or "radially" means any direction perpendicular to the axis of rotation X.

Also, by convention in this application, the terms "internal", "external", "inner" and "outer" are defined radially with respect to the axis of rotation X.

In a first configuration, the first element 2 is rotatable about the axis of rotation X and the second element 3 is stationary. The second element 3 extends around the first element 2. In such a configuration, the first element 2 of the sealing assembly is, for example, a flask arranged between two movable wheels of a turbine 37, 28 of the turbine engine 32 and the second element 3 is a dispenser of the corresponding turbine. In such an example, the axis of rotation X of the sealing assembly is coaxial with the axis of rotation X' of the turbine engine 32.

In a second configuration, the first element is rotatable about the axis of rotation X and the second element is stationary. The first element extends around the second element.

In a third configuration, the first element is rotatable in a first direction of rotation and the second element is rotatable in a second direction of rotation which is opposite to the first direction of rotation, the first and second elements being counter-rotating.

The embodiments shown in the figures correspond to the first configuration, i.e. the first element 2 is rotatable about the axis of rotation X and the second element 3 is stationary. The second element 3 extends around the first element 2.

According to the embodiments shown in the figures, the sealing assembly 1 comprises a single wiper 4$a$-4$d$.

The sealing assembly can, of course, comprise several wipers. The wipers are then carried by the first element. The abradable member extends tangentially opposite the individual wipers. Advantageously, each wiper comprises the technical characteristics of the invention.

According to the embodiments shown in the figures, the first element 2 and the wiper 4$a$-4$d$ form the rotor portion of the sealing assembly 1. The first element 2 which carries the wiper 4$a$-4$d$ is in the form of a base plate. The wiper 4$a$-4$d$ is arranged outside the first element 2. The wiper 4$a$-4$d$ extends radially outwards from the first element 2, i.e. towards the abradable member 5. The first element 2 is rectangular in cross-section and is came from matter with the body of the wiper 4$a$-4$d$.

The wiper 4$a$-4$d$ comprises an annular body 7 extending continuously about the axis of rotation X. The body 7 comprises a base 8 adjoining the first element 2 and a summit defined by an outer surface 9. The body 7 is delimited laterally by two lateral surfaces 10.

According to the embodiments shown in the figures, the second element 3 and the abradable member 5 form the stator portion of the sealing assembly 1. The second element 3 which carries the abradable member 5 is in the form of a ring. The abradable member 5 is arranged inside the second element 3. The abradable member 5 extends around the wiper 4$a$-4$d$. The second element 3 is rectangular in cross-section and separate from the abradable member 5, the abradable member 5 being fitted to the second element 3.

The abradable member 5 is annular and is formed by abradable material. The second element 3 and the abradable member 5 are not shown in FIGS. 12 to 21 for reasons of clarity, they are identical throughout the assembly of the FIGS. 2 to 21.

The abradable member 5 may be in the form of a homogeneous or heterogeneous layer (a coating or a lining) obtained by thermal projection (in particular plasma projection). The layer is for example made of a CoNiCrAlY alloy.

The abradable member 5 may also be in the form of a cellular or honeycombed structure.

Generally, the honeycombed structures have the advantage of being able to withstand higher temperatures than those supported by the compact layer structures. However, the honeycombed structures usually induce an additional load loss due to the presence of the cells.

The wiper 4$a$-4$d$ comprises primary angular segments 11 (hereinafter referred to as "primary segments") each extending tangentially along a primary angular sector 11'. The primary segments 11 each have a constant first profile 12 in cross-section.

Figure 6:
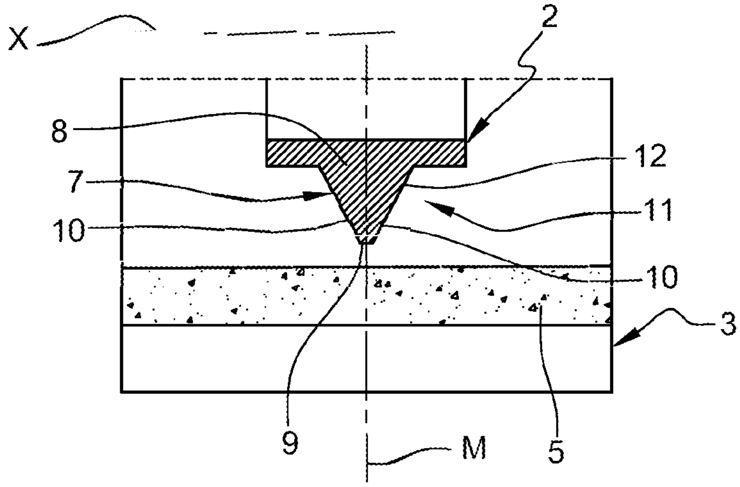
FIG. 6 is a cross-sectional view along the sectional plane B-B of FIG. 3.
Figure 7:
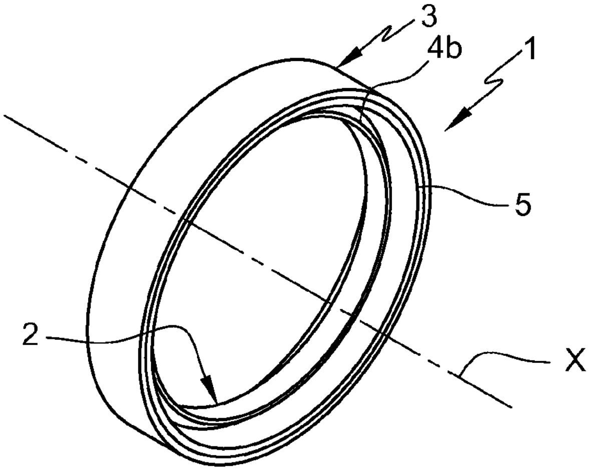
FIG. 7 is a perspective view of a sealing assembly according to a second embodiment of the invention.
Figure 8:
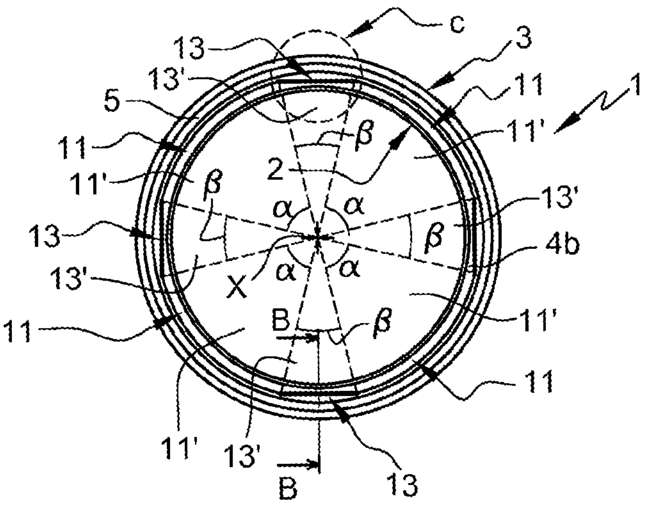
FIG. 8 is a front view of the assembly shown in FIG. 7.
Figure 9:
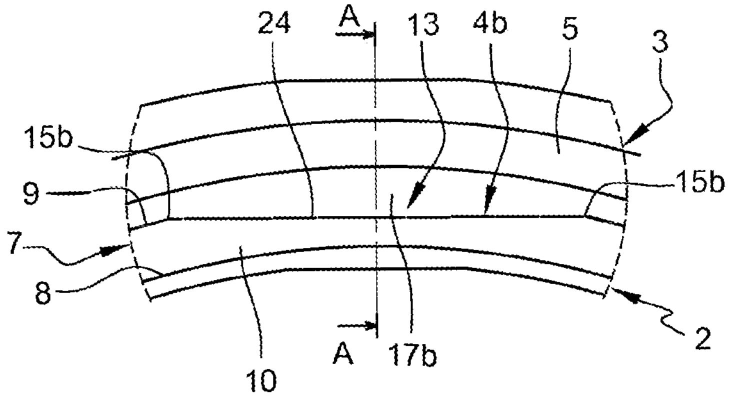
FIG. 9 is a detail view according to the reference frame C of FIG. 8.

According to the embodiments illustrated in the figures, the first constant profile 12 common to the assembly of the primary segments 11 is substantially triangular (see FIG. 6). At the level of a primary segment 11, the body 7 of the wiper 4$a$-4$d$ then becomes thinner progressively from the base 8 to the summit (defined by an outer surface 9).

The embodiments illustrated in the figures are in no way limiting, the first constant profile 12 common to the assembly of the primary segments 11 could of course have another shape in cross-section, for example trapezoidal.

The primary angular sector 11' of each of the primary segments 11 is defined in particular by an angle at the centre $\alpha$. The primary angular sectors 11' are shown as dotted lines in the figures.

According to the invention, the wiper 4$a$-4$d$ also comprises secondary angular segments 13 (hereinafter referred to as "secondary segments") each extending tangentially along a secondary angular sector 13'. The secondary segments 13 each have a second profile 14 in cross-section different from the first profile 12. The number of secondary angular segments 13 is equal to the number of primary angular segments 11. The secondary angular segments 13 are interposed between the primary angular segments 11.

The wiper 4$a$-4$d$ according to the invention thus comprises an alternation (or alternating succession) of primary segments 11 and secondary segments 13, and in other words two successive primary segments 11 are separated from each other by a secondary segment 13.

The alternation of primary segments 11 and secondary segments 13 creates a discontinuity around the axis of rotation X, which is conducive to the cut-out of the abradable member 5 and to the evacuation of the abradable material chips. Such a discontinuity also allows to avoid the prolonged contact between the wiper 4$a$-4$d$ and the abradable member 5, and thus limits the heating induced by the contact.

The secondary angular sector 13' of each of the secondary segments 13 is defined in particular by an angle at the centre $\beta$. The secondary angular sectors 13' are shown dotted in the figures.

The number of primary and secondary segments per wiper can vary and depends on several parameters, in particular the materials, the second profile and the rotational speed of the first element.

The secondary segments may have different geometric and dimensional characteristics.

The secondary segments may be identical in groups (two, three, etc.) and evenly distributed around the axis of rotation X, so as to balance the first element, i.e. to avoid the unbalances.

Advantageously, the assembly of the secondary segments are identical to each other, so as to balance the first element.

Advantageously, the secondary segments are evenly distributed around the axis of rotation X, so as to balance the first element.

Advantageously, the wiper has a median plane of symmetry M perpendicular to the axis of rotation X, so as to balance the first element.

The second profile 14 of a secondary segment 13 is different from the first profile 12 common to the primary segments 11.

The second profile of a secondary segment may be constant from one angular position to another.

Advantageously, the second profile of a secondary segment varies from one angular position to another. A variation of the second profile allows to prevent the prolonged contacts between the wiper and the abradable member.

Advantageously, each secondary segment comprises at least one sharp edge (sharp edge, cutting edge or projecting edge). Such an edge allows to make it easier to cut-out the abradable member during a contact, and thus limits the heating induced by the contacts between the wiper and the abradable member. To maximise the cut-out, the sharp edge may be parallel to the axis of rotation X or inclined at an acute angle with respect to the axis of rotation X. The sharp edge can be obtained by adding or removing material at the level of the body of the wiper, for example. The sharp edge can also be obtained by adding a wafer to the body of the wiper.

Each secondary segment may comprise a first recess open radially outwards. The first recess of each secondary segment may open onto at least one lateral surface of the wiper. The first recess of each secondary segment may be in the form of a circular segment. The first recess of each secondary segment may form a flat on an outer surface of the wiper.

Each secondary segment may comprise a second recess symmetrical to the first recess with respect to a median plane M of the wiper. The median plane M is perpendicular to the axis of rotation X of the sealing assembly.

The recess or the recesses create one or more voids that facilitate the evacuation of the abradable material chips from the sealing assembly, and thereby limit the heating induced by the contacts.

Each secondary segment may comprise a wafer fitted on an outer surface of the body of the wiper. The wafer may comprise a base and two opposing wings each extending from the base. The base then is supported on the outer surface of the body and each of the wings is supported on a lateral surface of the body.

According to the first embodiment illustrated in FIGS. 2 to 6, the wiper 4*a* of the sealing assembly 1 comprises three identical secondary segments 13 evenly distributed around the axis of rotation X. The secondary angular sector 13' of each secondary segment 13 has an angle at the centre β of approximately 12°.

Figure 5:
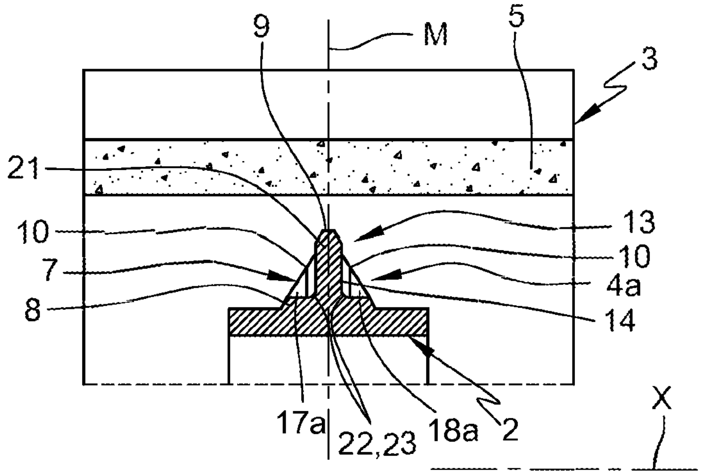
FIG. 5 is a cross-sectional view along the sectional plane A-A of FIG. 4.

As illustrated in the figures, and in particular FIG. 5, each secondary segment 13 has a second T-shaped profile 14 in cross-section.

More precisely, each secondary segment 13 comprises two recesses 17*a*, 18*a* symmetrical with respect to the median plane M of the wiper 4*a*. Each secondary segment 13 (or secondary angular sector 13') is angularly delimited by each of the tangential ends of the recesses 17*a*, 18*a*. Each recess 17*a*, 18*a* is open radially outwards and opens onto a lateral surface 10 of the body 7 of the wiper 4*a*. Each recess 17*a*, 18*a* is blind (or not opening), i.e. the two recesses 17*a*, 18*a* do not communicate with each other. Each recess 17*a*, 18*a* is shaped like a circular segment. The body 7 thus comprises a central crest 21 (centred on the median plane M) delimited laterally by each of the recesses 17*a*, 18*a*. Each recess 17*a*, 18*a* is defined by a sharp edge 15*a*. The sharp edge 15*a* of each recess 17*a*, 18*a* has a closed curved outline. Each recess 17*a*, 18*a* comprises a bottom 22 having a connection fillet 23.

According to the second embodiment illustrated in FIGS. 7 to 11, the wiper 4*b* of the sealing assembly 1 comprises four identical secondary segments 13 evenly distributed around the axis of rotation X. The secondary angular sector 13' of each secondary segment 13 has an angle at the centre β of approximately 25°.

Figure 10:
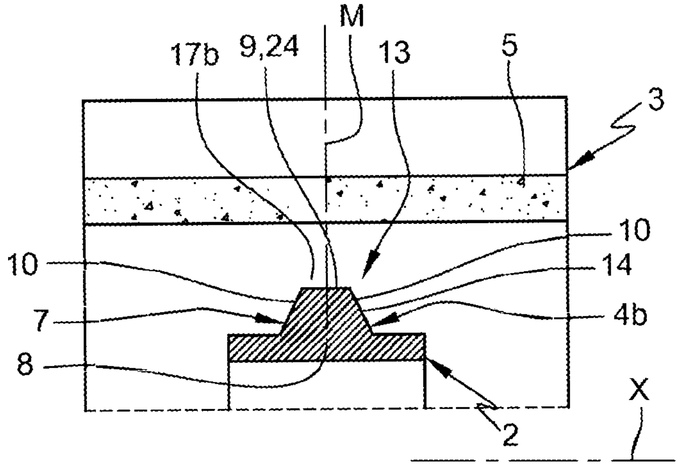
FIG. 10 is a cross-sectional view along the sectional plane A-A of FIG. 9.
Figure 11:
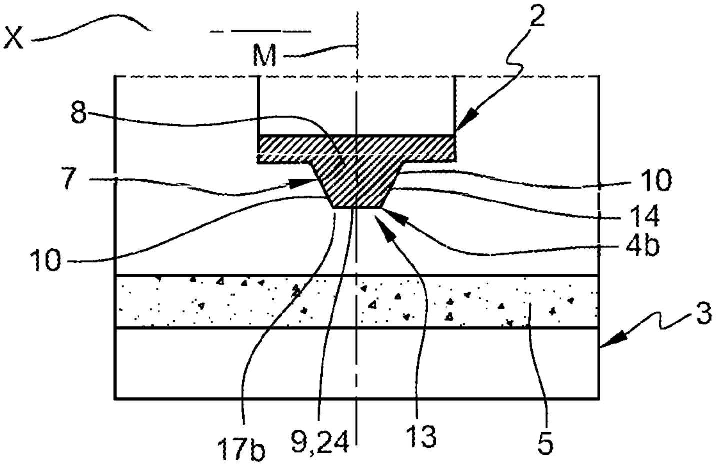
FIG. 11 is a cross-sectional view along the sectional plane B-B of FIG. 8.
Figure 12:
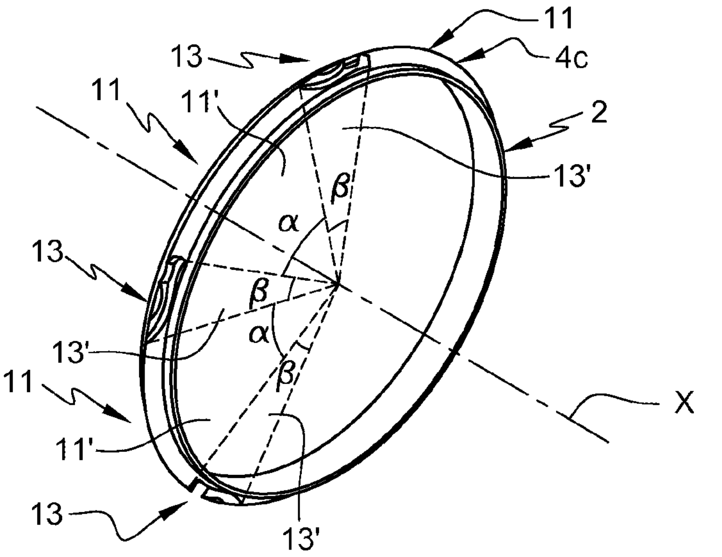
FIG. 12 is a perspective view of a wiper of a sealing assembly according to a third embodiment of the invention.
Figure 13:
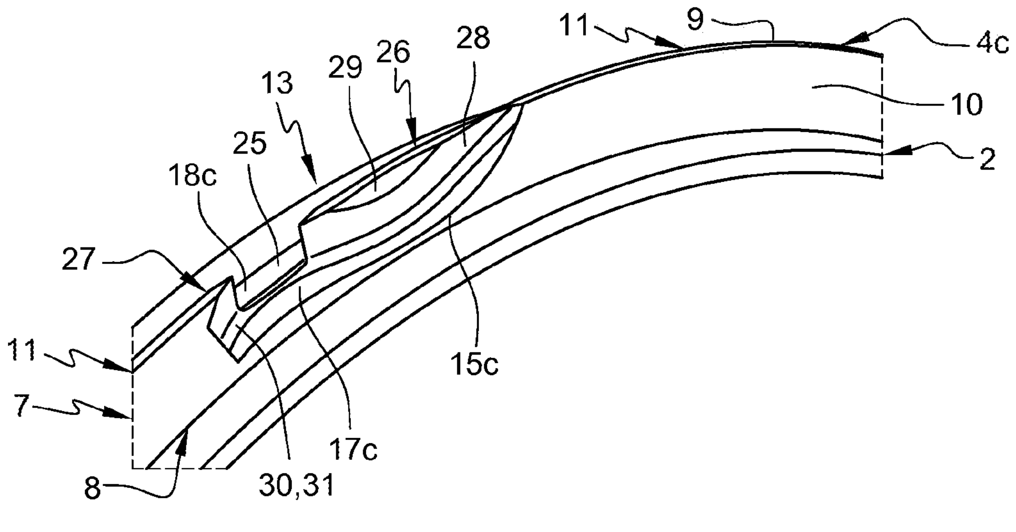
FIG. 13 is a detailed perspective view of the wiper in FIG. 12.
Figure 14:
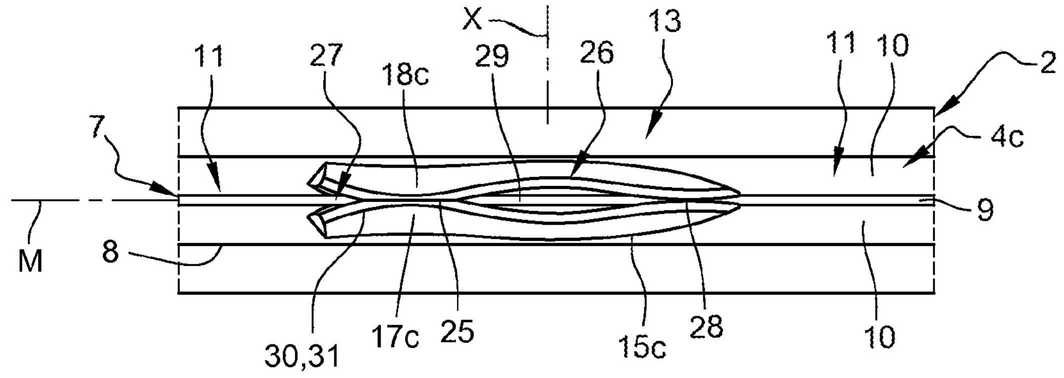
FIG. 14 is a detailed top view of the wiper in FIG. 12.
Figure 15:
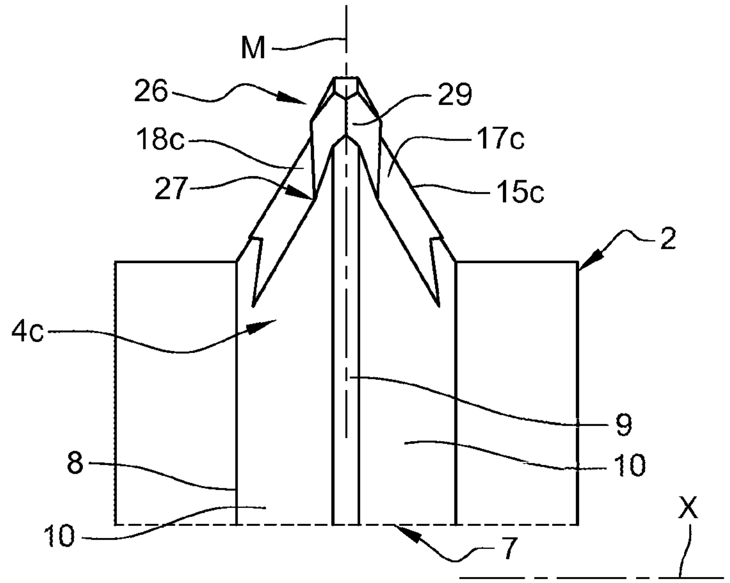
FIG. 15 is a detailed side view of the wiper in FIG. 12.
Figure 16:
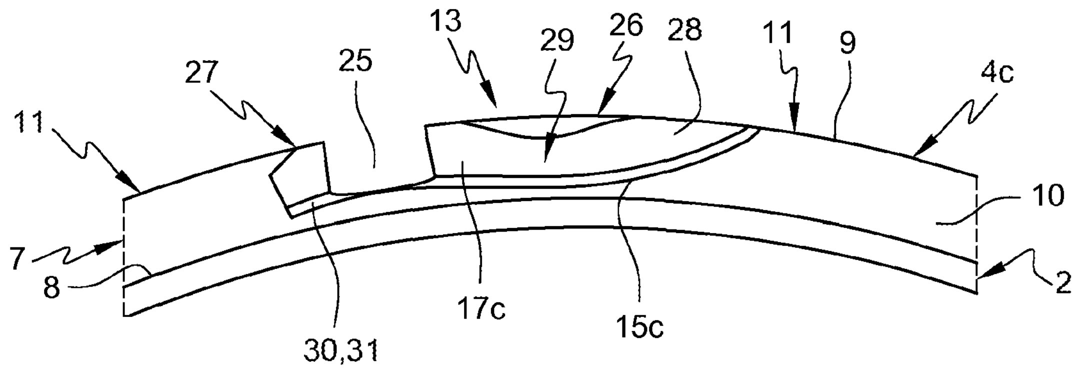
FIG. 16 is a detailed front view of the wiper in FIG. 12.
Figure 17:
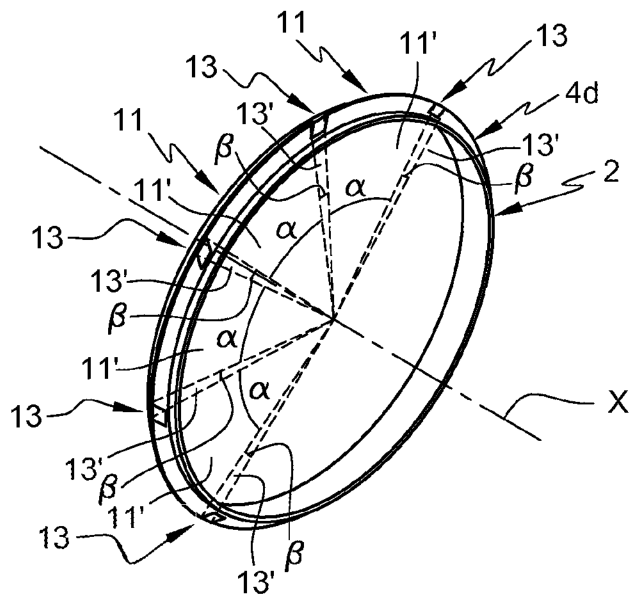
FIG. 17 is a perspective view of a wiper of a sealing assembly according to a fourth embodiment of the invention.
Figure 18:
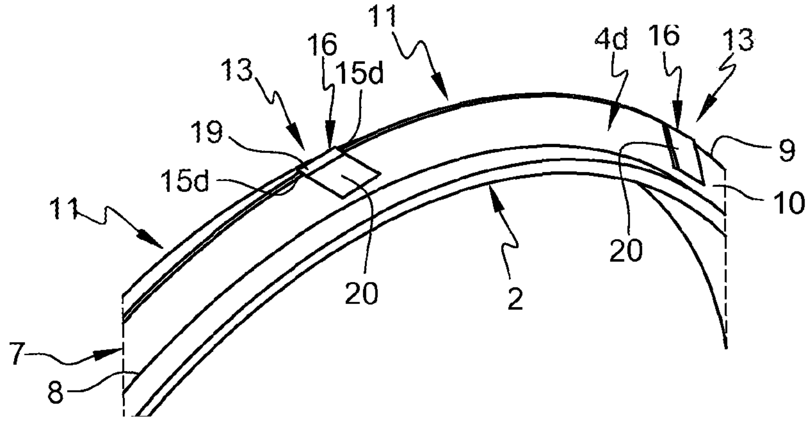
FIG. 18 is a detailed perspective view of the wiper in FIG. 17.
Figure 19:
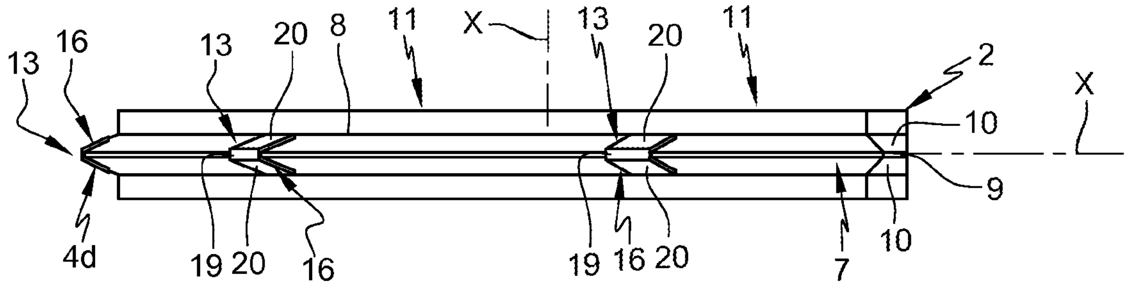
FIG. 19 is a detailed top view of the wiper in FIG. 17.
Figure 20:
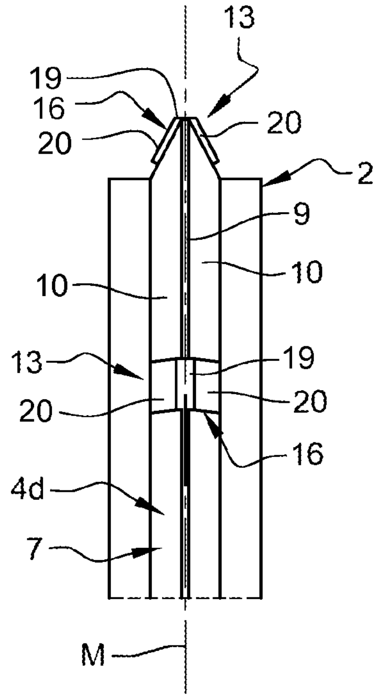
FIG. 20 is a detailed side view of the wiper in FIG. 17.
Figure 21:
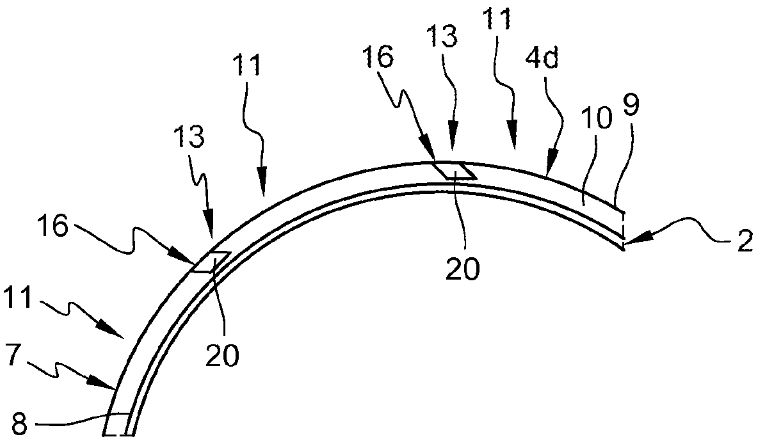
FIG. 21 is a detailed front view of the wiper in FIG. 17.

As illustrated in the figures, and in particular FIGS. 10 and 11, each secondary segment 13 has a second trapezoidal profile 14 in cross-section.

More specifically, each secondary segment 13 comprises a through or open recess 17*b*. Each secondary segment 13 (or secondary angular sector 13') is angularly delimited by each of the tangential ends of the recess 17*b*. The recess 17*b* forms a flat 24 (or planar face) on the outer surface 9 of the wiper 4*b*. The flat 24 is tangentially delimited by two sharp edges 15*b*, each in the form of a sharp ridge. The sharp edges 15*b* are substantially parallel to the axis of rotation X.

The second embodiment has the advantage of being simple to manufacture.

According to the third embodiment illustrated in FIGS. 12 to 16, the wiper 4*c* of the sealing assembly 1 comprises six identical secondary segments 13 evenly distributed around the axis of rotation X. The secondary angular sector 13' of each secondary segment 13 has an angle at the centre β of approximately 15°.

As illustrated in the figures, each secondary segment 13 has a second complex evolving profile 14 in cross-section.

More precisely, each secondary segment 13 comprises two recesses 17*c*, 18*c* symmetrical to the median plane M of the wiper 4*c*. Each secondary segment 13 (or secondary angular sector 13') is angularly delimited by each of the tangential ends of the recesses 17*c*, 18*c*. Each recess 17*c*, 18*c* is open radially outwards and opens onto a lateral surface 10 of the body 7 of the wiper 4*c*. Each recess 17*c*, 18*c* is partially or locally open (or through), so as to form a passage 25 or a communication between the two recesses 17*c*, 18*c*. The body 7 thus comprises a tapered segment 26 (or crest) and a pointed segment 27 separated from each other by the passage 25 and bordered by the recesses 17*c*, 18*c*. The tapered segment 26 comprises a biconcave stretch 28 and a biconvex stretch 29. The biconcave stretch 28 is adjacent to a primary segment 11 and the biconvex stretch 29 is tangentially arranged between the biconcave stretch 28 and the passage 25. The passage 25 is tangentially delimited by two radial sharp ridges, namely a first sharp ridge of the pointed segment 27 and a second sharp ridge of the biconvex stretch 29 of the tapered segment 26. Each recess 17*c*, 18*c* is defined by a sharp edge 15*c*. The sharp edge 15*c* of each recess 17*c*, 18*c* has an open curved outline. Each recess 17*c*, 18*c* comprises a bottom 30, here with a connection fillet 31.

The recesses described in the first, second and third embodiments can be produced by machining on machine tools (e.g. a numerically controlled machine) via various operations. If a protective coating is applied to the wiper or the wipers, the recesses may be machined before or after the protective coating is applied.

According to the fourth embodiment illustrated in FIGS. 17 to 21, the wiper 4*d* of the sealing assembly 1 comprises eight identical secondary segments 13 evenly distributed around the axis of rotation X. The secondary angular sector 13' of each secondary segment 13 has an angle at the centre β of approximately 10°.

As illustrated in the figures, each secondary segment 13 has a constant complex second profile 14 in cross-section.

More specifically, each secondary segment 13 comprises a wafer 16 fitted on the outer surface 9 of the body 7 of the wiper 4*d*. Each secondary segment 13 (or secondary angular sector 13') is angularly delimited by each of the tangential ends of the wafer 16. The wafer 16 has a V-shaped profile in cross-section. The wafer 16 overlaps the body 7 of the wiper 4*d*. The wafer 16 comprises a base 19 and two opposing wings 20 each extending from the base 19. The base 19 is then supported on the outer surface 9 of the body 7 and each of the wings 20 is supported on a lateral surface 10 of the body 7. The wafer 16 has a constant thickness but could be scalable. The base 19 is delimited tangentially by two sharp edges 15*d*, each in the form of a sharp ridge. The sharp edges 15*d* are substantially parallel to the axis of rotation X.

In the assembly of the embodiments, the elements of the sealing assembly are generally made of one or more heat-resistant materials, for example a metallic material (high performance alloy or superalloy) or a ceramic material.

The material or the materials used will depend in particular on the temperature of the environment in which the sealing assembly is placed.

The wiper or the wipers may comprise one or more protective surface coatings. The protective coating or coatings generally allow to protect the wiper from wear and temperature during contact. The protective coating comprises for example titanium dioxide.

The body of the wiper may be integral (or in one part).

The invention claimed is:

1. A sealing assembly for a turbine engine comprising a first element and a second element, the first and second elements being concentric and in relative rotational movement with respect to each other about an axis of rotation, said sealing assembly comprising at least one first wiper and an abradable member, the at least one first wiper being annular in shape and carried by the first element, the at least one first wiper extending radially towards the abradable member and continuously around the axis of rotation, the abradable member being annular in shape and carried by the second element, the abradable member extending tangentially opposite the at least one first wiper, the at least one first wiper comprising primary angular segments each extending tangentially along a primary angular sector, said primary angular segments each having, in cross-section, a first constant profile, wherein the at least one first wiper comprises secondary angular segments each extending tangentially along a secondary angular sector, said secondary angular segments each having, in cross-section, a second profile different from said first profile, the number of secondary angular segments being equal to the number of primary angular segments, the secondary angular segments being interposed between the primary angular segments, wherein each secondary segment comprises a first recess open radially outwards and a second recess symmetrical to the first recess with respect to a median plane of the at least one first wiper, the median plane being perpendicular to the axis of rotation of the sealing assembly, wherein each secondary segment comprises a central crest which is centered on the median plane of the at least one first wiper, the central crest being delimited laterally by each of the first and second recesses.

2. The sealing assembly according to claim 1, wherein the second profile of at least one of the secondary angular segments varies from one angular position to another.

3. The sealing assembly according to claim 1, wherein each secondary segment comprises at least one sharp edge.

4. The sealing assembly according to claim 1, wherein said sealing assembly comprises a second wiper independent of and axially distant from the at least one first wiper, the abradable member extending tangentially opposite the second wiper.

5. A turbine engine comprising at least one sealing assembly according to claim 1.

6. The sealing assembly according to claim 1, wherein each of the first and second recesses is blind.

7. The sealing assembly according to claim 1, wherein each of the first and second recesses is defined by a first sharp edge, the first sharp edge having a closed curved outline.

8. The sealing assembly according to claim 7, wherein the first recess opens onto at least one lateral surface of the at least one first wiper.

9. The sealing assembly according to claim 7, wherein the first recess is in the form of a circular segment.

10. The sealing assembly according to claim 1, wherein each of the first and second recesses is partially or locally open, so as to form a passage between the first and second recesses.

11. The sealing assembly according to claim 10, wherein each secondary segment comprises a tapered portion forming the central crest and a pointed portion separated from each other by the passage and bordered by the first and second recesses.

12. The sealing assembly according to claim 11, wherein the tapered portion comprises a biconcave stretch and a biconvex stretch.

13. The sealing assembly according to claim 12, wherein the biconcave stretch is adjacent to one of the primary segments and the biconvex stretch is tangentially arranged between the biconcave stretch and the passage.

14. The sealing assembly according to claim 13, wherein the passage is delimited tangentially by a first radial sharp ridge of the pointed portion and a second radial sharp ridge of the biconvex stretch of the tapered portion.

15. The sealing assembly according to claim 1, wherein each of the first and second recesses is defined by a second sharp edge, the second sharp edge having an open curved outline.

* * * * *